United States Patent
Tsujioka

(10) Patent No.: US 10,246,124 B2
(45) Date of Patent: Apr. 2, 2019

(54) POWER SUPPLY DEVICE AND ELECTRIC POWER STEERING DEVICE INCLUDING POWER SUPPLY DEVICE

(71) Applicant: Honda Motor Co., Ltd., Tokyo (JP)

(72) Inventor: Takashi Tsujioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 15/410,077

(22) Filed: Jan. 19, 2017

(65) Prior Publication Data
US 2017/0210413 A1    Jul. 27, 2017

(30) Foreign Application Priority Data
Jan. 21, 2016    (JP) .................................. 2016-009760

(51) Int. Cl.
B62D 5/04        (2006.01)
H02J 7/00        (2006.01)
(Continued)

(52) U.S. Cl.
CPC ........... B62D 5/0463 (2013.01); B62D 5/046 (2013.01); B62D 5/0481 (2013.01);
(Continued)

(58) Field of Classification Search
CPC .... B62D 5/0463; B62D 5/0481; B62D 5/046; H02P 7/03; H02P 6/17; H02J 7/0068
See application file for complete search history.

(56) References Cited

U.S. PATENT DOCUMENTS

| | | | |
|---|---|---|---|
| 2008/0088266 A1* | 4/2008 | Lucas | A01D 34/78 318/441 |
| 2014/0117884 A1* | 5/2014 | Sugiyama | B62D 5/046 318/9 |
| 2015/0008066 A1* | 1/2015 | Sugiyama | B62D 5/0481 180/443 |

FOREIGN PATENT DOCUMENTS

| | | |
|---|---|---|
| CN | 104276205 A | 1/2015 |
| JP | 2009-120081 A | 6/2009 |

(Continued)

OTHER PUBLICATIONS

Office Action dated Oct. 24, 2017, issued in counterpart Japanese Application No. 2016-009760, with English machine translation. (6 pages).

(Continued)

*Primary Examiner* — Jared Fureman
*Assistant Examiner* — Emmanuel Dominique
(74) *Attorney, Agent, or Firm* — Westerman, Hattori, Daniels & Adrian, LLP

(57) ABSTRACT

An electric power steering device includes a main power supply unit capable of supplying power to a load; an auxiliary power supply unit connected to the main power supply unit and capable of supplying charged power to the load; a boosting circuit capable of boosting a voltage supplied from the main power supply unit and applying a resulting voltage to the auxiliary power supply unit; a circuit switching unit interposed between the main power supply unit and the load and closing one of a first connection circuit extending from the main power supply unit to the load and a second connection circuit extending from the main power supply unit to the load via the auxiliary power supply unit; and a controller performing switching control on the circuit switching unit so as to close the second connection circuit if (Continued)

the magnitude of power required by the load exceeds a first threshold.

10 Claims, 5 Drawing Sheets

(51) Int. Cl.
*H02M 1/00* (2006.01)
*H02M 3/06* (2006.01)
*H02P 6/17* (2016.01)
*H02P 7/03* (2016.01)

(52) U.S. Cl.
CPC .............. *H02J 7/0068* (2013.01); *H02P 6/17* (2016.02); *H02P 7/03* (2016.02); *H02M 3/06* (2013.01); *H02M 2001/0093* (2013.01)

(56) References Cited

FOREIGN PATENT DOCUMENTS

| | | |
|---|---|---|
| JP | 2011-162113 A | 8/2011 |
| JP | 2012-162210 A | 8/2012 |
| JP | 2015-204655 A | 11/2015 |

OTHER PUBLICATIONS

Office Action dated Nov. 2, 2018, issued in counterpart Chinese Application No. 201611181055.2, with English translation. (8 pages).

* cited by examiner

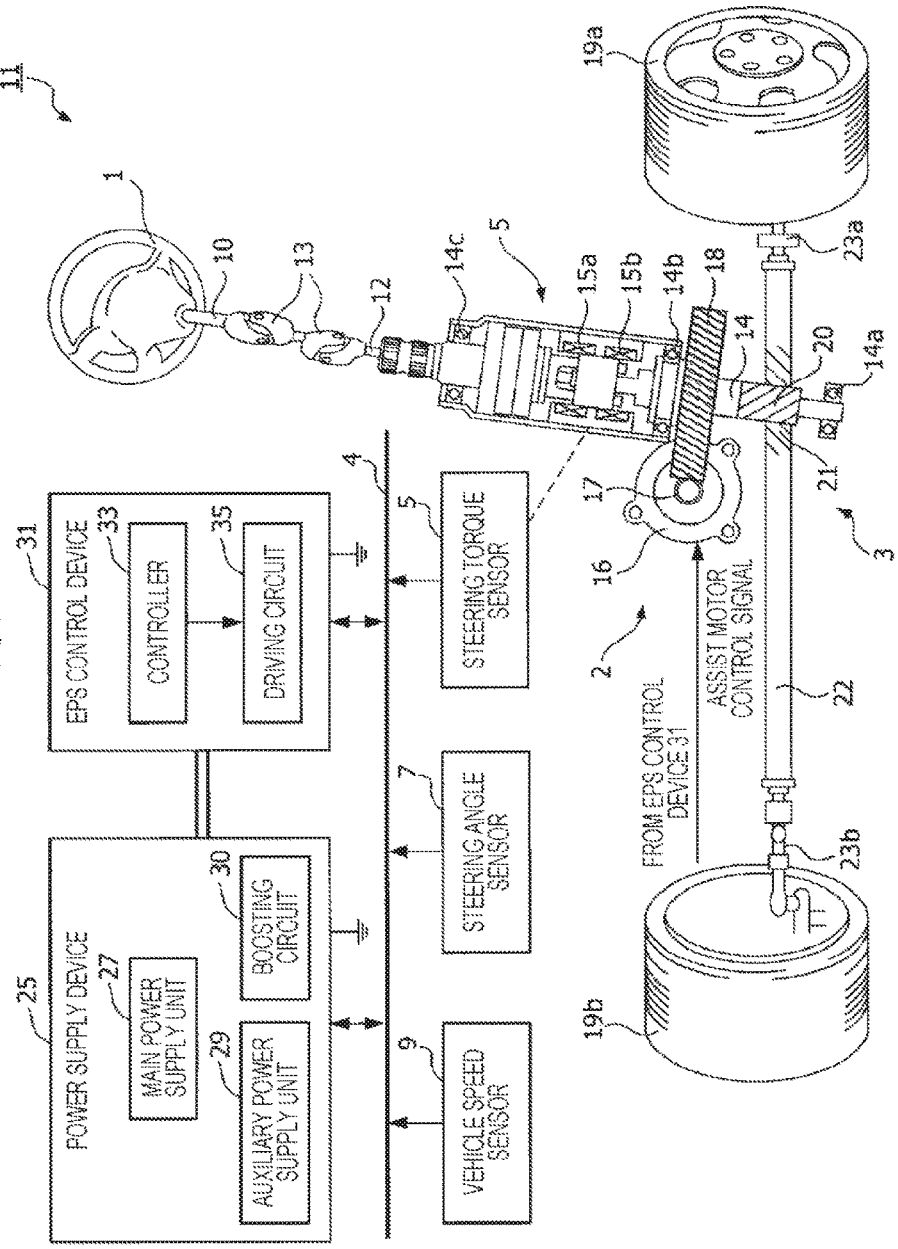

POWER SUPPLY DEVICE AND ELECTRIC POWER STEERING DEVICE INCLUDING POWER SUPPLY DEVICE

CROSS REFERENCES TO RELATED APPLICATIONS

The present application claims priority under 35 U.S.C. § 119 to Japanese Patent Application No. 2016-009760, filed Jan. 21, 2016, entitled "Power Supply Device And Electric Power Steering Device Including Power Supply Device." The contents of this application are incorporated herein by reference in their entirety.

TECHNICAL FIELD

The present disclosure relates to a power supply device that supplies power to an electric power steering device mounted in a vehicle, such as a car, and an electric power steering device that includes the power supply device.

BACKGROUND

In an electric power steering device that is mounted in a vehicle, such as a car, and that includes a steering assist motor, for example, if required steering assist power increases, it is necessary to provide a larger current to the steering assist motor. Therefore, in a case of parking a vehicle in a garage or in a parking lot, for example, where steering wheel operations are performed by the driver a number of times and power required by the steering assist motor rapidly increases, power corresponding to the required power might not be supplied by only an onboard battery (main power source).

In order to respond to such a case, Japanese Unexamined Patent Application Publication No. 2012-162210 (hereinafter referred to as PTL 1), for example, proposes a technique in which, in the case where power required by the steering assist motor rapidly increases when parking a vehicle in a garage or in a parking lot, for example, power from an auxiliary power source is added to power from the onboard battery (main power source) to thereby supply power corresponding to the power required by the steering assist motor.

An auxiliary power supply device according to PTL 1 includes a capacitor (auxiliary power source) that is connected to the main power source supplying power to a motor and that is capable of discharging to the motor, and a boosting circuit that boosts the voltage of the main power source and applies the resulting voltage to the capacitor. The auxiliary power supply device is controlled by a control device. When the supply of power from the main power source to the capacitor starts in a state that the voltage between the terminals of the capacitor is equal to or larger than the voltage of the main power source, the control device performs control to boost more the voltage applied by the boosting circuit, to the capacitor as the voltage between the terminals of the capacitor becomes larger.

With the auxiliary power supply device according to PTL 1, it is possible to suppress a backward current flowing from the auxiliary power source to the main power source upon the start of charging the auxiliary power source and to appropriately supply a forward current from the main power source to the auxiliary power source.

SUMMARY

According to study by the present inventor, with the auxiliary power supply device according to PTL 1, power is supplied from the onboard battery (main power source) to a driving circuit that drives the steering assist motor (load) via the capacitor (auxiliary power source). Therefore, in a case where the charge amount of the capacitor is small upon the start, of a vehicle, for example, it is not possible to charge the capacitor (auxiliary power source) quickly and independently of the onboard battery (main power source). In such a case, if power required by the steering assist, motor (load) rapidly increases, it might not be possible to supply power corresponding to the power required by the steering assist motor.

In the above-described case, if the auxiliary power supply device according to PTL 1 is used in the supply of power to the steering assist motor included in the electric power steering device, it is not possible to supply power corresponding to the power required by the steering assist motor, and the driver may experience awkwardness in steering.

The present application describes, for example, a power supply device by which, even in a case where power required by a load rapidly increases, power corresponding to the required power can be appropriately supplied.

Further, the present application describes, for example, an electric power steering device by which, even in a case where power required by a steering assist motor rapidly increases, comfortable steering can be provided to the driver.

A first aspect of the present disclosure provides a power supply device including a main power supply unit, an auxiliary power supply unit, a booster, a circuit switching unit, and a controller. The main power supply unit is capable of supplying power to a load. The auxiliary power supply unit is connected to the main power supply unit and is capable of supplying charged power to the load. The booster is connected to the main power supply unit in parallel to the auxiliary power supply unit and is capable of boosting a voltage supplied from the main power supply unit and applying a resulting voltage to the auxiliary power supply unit. The circuit switching unit is interposed between the main power supply unit and the load and closes one of a first connection circuit and a second connection circuit, the first connection circuit extending from the main power supply unit to the load, the second connection circuit extending from the main power supply unit to the load via the auxiliary power supply unit. The controller performs switching control on the circuit switching unit. The controller obtains information regarding a magnitude of power required by the load and, in a case where the magnitude of the power required by the load and indicated by the obtained information exceeds a predetermined first threshold, performs switching control on the circuit switching unit so as to close the second connection circuit.

In the first aspect of the present disclosure, the controller obtains information regarding the magnitude of power required by the load and, in the case where the magnitude of the power required by the load and indicated by the obtained information exceeds the predetermined first threshold, performs switching control on the circuit switching unit so as to close the second connection circuit extending from the main power supply unit to the load via the auxiliary power supply unit. Here, the information regarding the magnitude of the power required by the load may be the magnitude of the power required by the load or may conceptually include any index that correlates to the magnitude of the power required by the load. Further, the case where the magnitude of the power required by the load exceeds the predetermined first threshold is assumed to be a case where it is not possible to supply power corresponding to the required power by only the main power supply unit.

According to the first aspect of the present disclosure, the controller obtains information regarding the magnitude of power required by the load and, in the case where the magnitude of the power required by the load and indicated by the obtained information exceeds the predetermined first threshold, performs switching control on the circuit switching unit so as to close the second connection circuit extending from the main power supply unit to the load via the auxiliary power supply unit. Therefore, even in the case where the power required by the load rapidly increases, it is possible to appropriately supply power corresponding to the power required by the load by combining power from the main power supply unit and that from the auxiliary power supply unit.

In a second aspect of the present disclosure, the power supply device according to the first aspect may further include an open/close unit that is interposed between the booster and the auxiliary power supply unit, and opens or closes a contact provided on a path extending from the booster to the auxiliary power supply unit. The controller may control the open/close unit so as to close the contact in a case where a magnitude of the charged power of the auxiliary power supply unit is smaller than a predetermined second threshold.

According to the second aspect of the present disclosure, the controller controls the open/close unit so as to close the contact in the case where the magnitude of the charged power of the auxiliary power supply unit is smaller than the second threshold. Therefore, in addition to the effect of the first aspect described above, it is possible to charge the auxiliary power supply unit independently of the main power supply unit.

A third aspect of the present disclosure provides an electric power steering device to be mounted in a vehicle, the electric power steering device including the power supply device according to the first aspect. The power supply device supplies power to a steering assist motor provided to the electric power steering device. The controller obtains the magnitude of the power required by the load on the basis of at least one of a steering torque of a steering member of the vehicle and a vehicle speed.

According to the third aspect of the present disclosure, the controller obtains the magnitude of the power required by the load on the basis of at least one of the steering torque of the steering member of the vehicle and the vehicle speed. Therefore, switching control on the circuit switching unit can be performed on the basis of the magnitude of power required by the load, the magnitude being determined with high accuracy. Consequently, it is possible to more appropriately supply power corresponding to the power required by the load.

Further, according to the third aspect of the present disclosure, even in the case where the power required by the steering assist motor rapidly increases, comfortable steering can be provided to the driver.

BRIEF DESCRIPTION OF THE DRAWINGS

The advantages of the disclosure will become apparent in the following description taken in conjunction with the following drawings.

FIG. 1 is a block diagram of an electric power steering device including a power supply device according to an embodiment of the present disclosure and a peripheral section.

FIG. 2B is a circuit diagram for describing an operation performed in the power supply device according to an embodiment of the present disclosure when the power-increase mode is turned on.

DETAILED DESCRIPTION

Figure 2A:
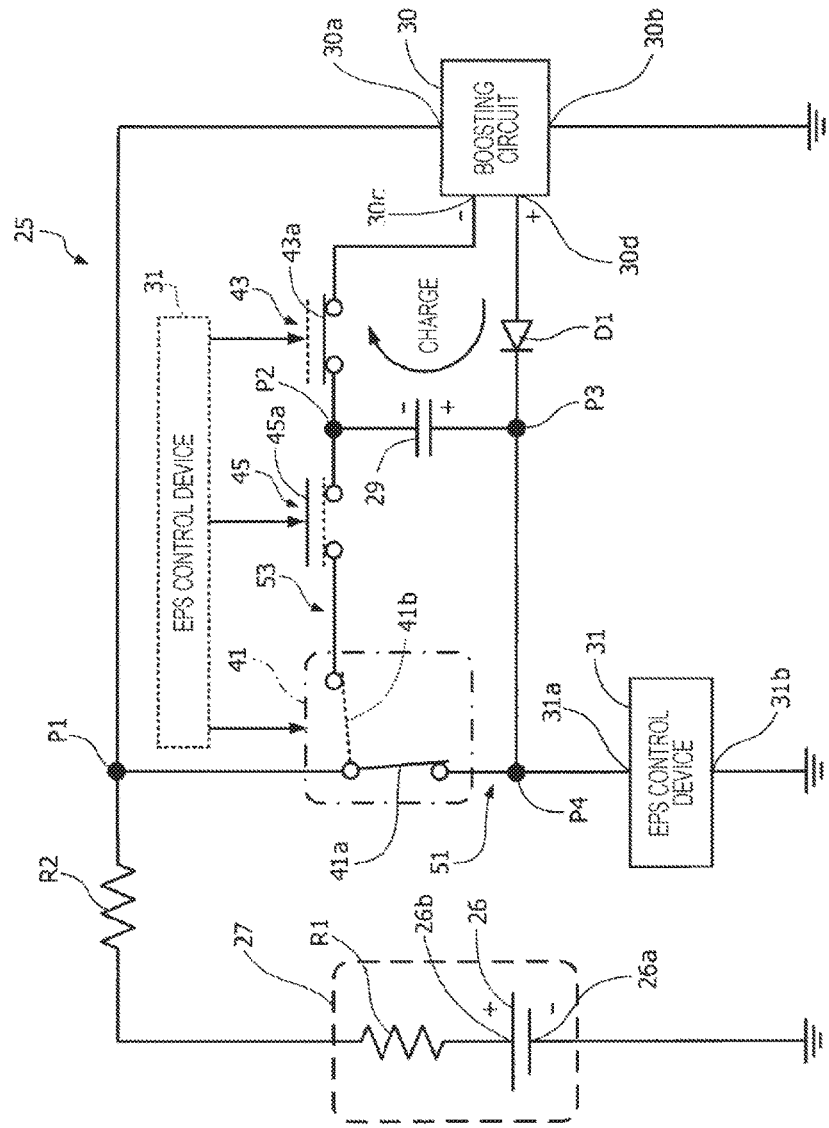
FIG. 2A is a circuit diagram for describing an operation performed in the power supply device according to an embodiment of the present disclosure when a power increase mode is turned off.

Hereinafter, an electric power steering device according to an embodiment of the present disclosure is described in detail with reference to the drawings.

Note that in the drawings described below, members having a common function or members respectively having mutually corresponding functions are assigned a common reference numeral in principle. For convenience of description, a member may be schematically illustrated by modifying or emphasizing the size or form thereof.

Configuration of Electric Power Steering Device According to Embodiment of the Present Disclosure First, the configuration of an electric power steering device 11 according to an embodiment of the present disclosure is described with reference to FIG. 1. FIG. 1 is a block diagram of the electric power steering device 11 according to an embodiment of the present disclosure and a peripheral section.

The electric power steering device 11 includes a steering wheel 1, a steering assist device 2, a turning device 3, a communication medium 4, such as a controller area network (CAN), a steering torque sensor 5, a steering angle sensor 7, a vehicle speed sensor 9 that detects the speed (vehicle speed) of the vehicle, a power supply device 25, and an electric power steering control device (hereinafter abbreviated as "EPS control device") 31, as illustrated in FIG. 1.

The steering wheel (steering member) 1 is used to change the direction of travel of the vehicle not illustrated to a desired direction. To the center portion of the steering wheel 1, a first steering shaft 10 and a second steering shaft 12 are mechanically coupled via a pair of universal joints 13 connected in series. To the second steering shaft 12, a pinion shaft 14 is coupled. The pinion shaft 14 has a lower portion, a middle portion, and an upper portion that are supported by a bearing 14a, a bearing 14b, and a bearing 14c respectively so as to be rotatable.

The pinion shaft 14 is provided with the steering torque sensor 5 that is disposed close to the second steering shaft 12. The steering torque sensor 5 has a function of detecting the magnitude and direction of a steering torque input from the steering wheel 1, by using solenoid coils 15a and 15b, for example. A steering torque signal detected by the steering torque sensor 5 is input to the EPS control device 31.

The steering assist, device 2 has a function of augmenting a steering force applied to the steering wheel 1 by the driver. The steering assist device 2 includes an assist motor 16 for supplying assist power for reducing the steering force to be applied to the steering wheel 1 by the driver, and a worm wheel gear 18 that engages a worm gear 17 provided to the output shaft of the assist motor 16. The assist motor 16 corresponds to "steering assist motor" of the present disclosure. The worm wheel gear 18 is disposed around the pinion shaft 14 such that the pinion shaft 14 is positioned at the center of rotation thereof.

The worm wheel gear 18 is provided with the steering angle sensor 7 that detects the steering angle of the steering wheel 1. A steering angle signal detected by the steering angle sensor 7 is input to the EPS control device 31 via the communication medium 4.

As the assist motor 16, a three-phase brushless motor including a stator (not illustrated) that includes a plurality of field coils and a rotor (not illustrated) that rotates inside the stator, for example, may be employed. Note that a DC brush motor may be used as the assist motor 16.

The turning device 3 has a function of transmitting a steering force applied to the steering wheel 1 by the driver to turning wheels 19a and 19b. The turning device 3 includes a pinion gear 20 disposed on the pinion shaft 14, a rack shaft 22 having rack teeth 21 that engage the pinion gear 20 and capable of reciprocating in the vehicle width direction, tie rods 23a and 23b provided on the respective sides of the rack shaft 22, and the turning wheels 19a and 19b provided so as to be rotatable via the tie rods 23a and 23b respectively.

The power supply device 25 has a function of supplying power to the EPS control device 31. To implement this function, the power supply device 25 includes a main power supply unit 27 including a battery 26 (not illustrated in FIG. 1) mounted in the vehicle, an auxiliary power supply unit 29 formed of a capacitor that can supply charged power, and a boosting circuit 30 that supplies a charging voltage to the auxiliary power supply unit 29. The boosting circuit 30 corresponds to "booster" of the present disclosure. The power supply device 25 is described in detail below.

The EPS control device 31 has a function of controlling steering assist power for the steering wheel 1 produced by electric power steering (EPS), by referring to various signals including a steering torque signal detected by the steering torque sensor 5, a steering angle signal detected by the steering angle sensor 7, and a vehicle speed signal detected by the vehicle speed sensor 9. The EPS control device 31 includes a controller 33 formed of a microcomputer that performs arithmetic processing, and a driving circuit 35 for the assist motor 16, as illustrated in FIG. 1

The controller 33 of the EPS control device 31 has a function of receiving signals from various sensors including the steering torque sensor 5, the steering angle sensor 7, and the vehicle speed sensor 9 and obtaining steering information that includes the steering torque and steering angle of the steering wheel 1 and vehicle speed information, an EPS control function of controlling the steering assist power for the steering wheel 1 by referring to the obtained steering information and vehicle speed information, and a function of performing control to turn on a power increase mode when the load of the assist motor 16 increases.

The driving circuit 35 of the EPS control device 31 has a function of driving the assist motor 16 on the basis of the steering assist power for the steering wheel 1 that is set by the controller 33 on the basis of traveling information including the vehicle speed information and steering information.

Figure 2B:
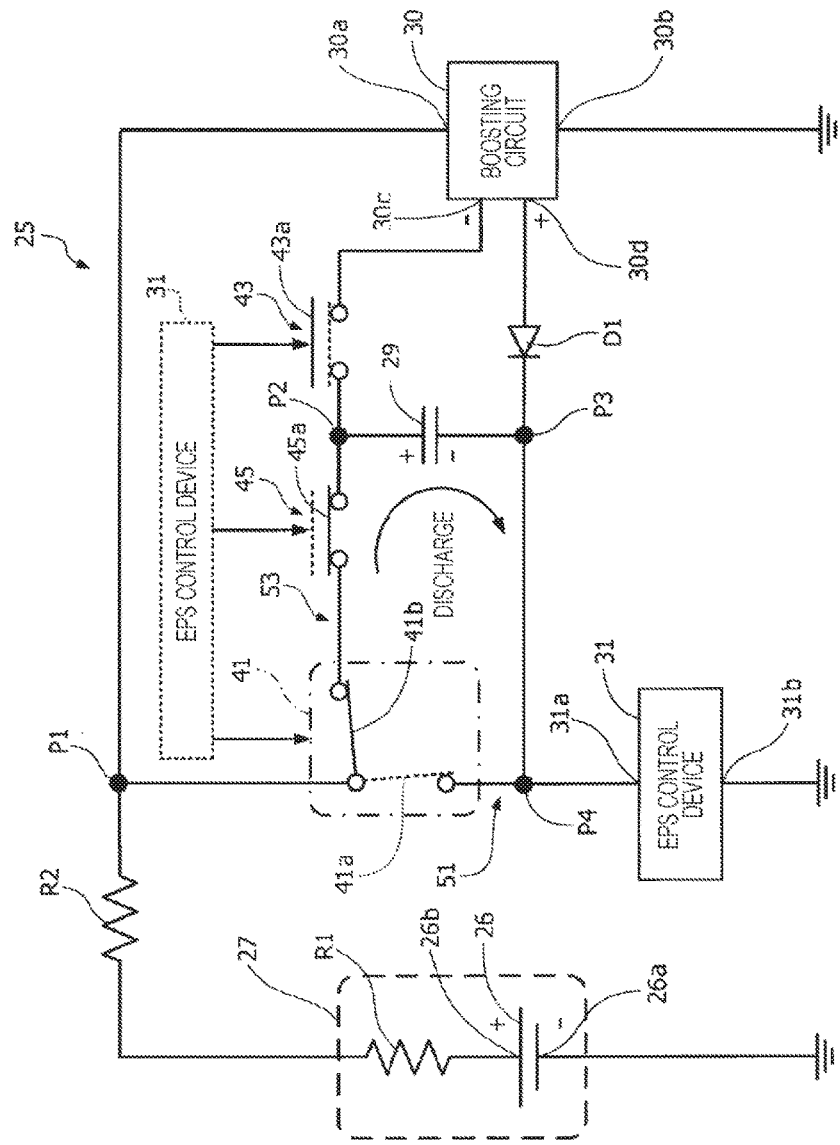

Configuration of Power Supply Device According to Embodiment of the Present Disclosure Now, the configuration of the power supply device 25 according to an embodiment of the present disclosure is described with reference to FIGS. 2A and 2B. FIG. 2A is a circuit diagram for describing an operation performed in the power supply device 25 when the power increase mode is turned off, the power increase mode being used to supply, to the load, power from the auxiliary power supply unit 29 in addition to power from the main power supply unit 27. FIG. 2B is a circuit diagram for describing an operation performed in the power supply device 25 when the power increase mode is turned on.

The power supply device 25 includes the main power supply unit 27, the auxiliary power supply unit 29, the boosting circuit 30, a circuit switching unit 41, a first open/close unit 43, and a second open/close unit 45, as illustrated in FIGS. 2A and 2B.

The main power supply unit 27 and the auxiliary power supply unit 29 have a function of supplying power to the EPS control device 31 that drives and controls the assist motor 16. The assist motor 16 and the EPS control device 31 correspond to "load" of the present disclosure.

Specifically, the main power supply unit 27 includes the battery 26 and an internal resistor R1, as illustrated in FIGS. 2A and 2B. The negative terminal 26a of the battery 26 is grounded, and the positive terminal 26b of the battery 26 is connected to a first junction point P1 via the internal resistor R1 and a circuit resistor R2.

The auxiliary power supply unit 29 formed of the capacitor is interposed between a second junction point P2 and a third junction point P3, as illustrated in FIGS. 2A and 2B.

The boosting circuit 30 has a function of supplying a charging voltage to the auxiliary power supply unit 29 formed of the capacitor by boosting a voltage supplied from the main power supply unit 27 to a predetermined level and applying the resulting voltage to the auxiliary power supply unit 29. The boosting circuit 30 is connected to the auxiliary power supply unit 29 in parallel when viewed from the main power supply unit 27, as illustrated in FIGS. 2A and 2B. The boosting circuit 30 may be formed by using an isolated DC/DC converter, for example.

Specifically, the input terminal 30a of the boosting circuit 30 is connected to the first junction point P1, and the ground terminal 30b of the boosting circuit 30 is grounded. The negative output terminal 30c of the boosting circuit 30 is connected to the second junction point. P2 via the first open/close unit 43 described below, and the positive output terminal 30d of the boosting circuit 30 is connected to the third junction point P3 via a diode D1 arranged in the forward direction.

The circuit switching unit 41 is interposed between the main power supply unit 27 and the EPS control device 31, as illustrated in FIGS. 2A and 2B. Specifically, the circuit switching unit 41 is interposed so as to be positioned between the first junction point P1 and a fourth junction point P4 and between the first junction point P1 and the second junction point P2. The fourth junction point P4 is connected to the third junction point P3 and is connected to the power supply terminal 31a of the EPS control device 31. The ground terminal 31b of the EPS control device 31 is grounded.

The circuit switching unit 41 operates so as to close a first connection circuit 51 or a second connection circuit 53 in accordance with an instruction provided by the EPS control device 31, the first connection circuit 51 being a path that extends from the main power supply unit 27 to the EPS control device 31 and that includes a first contact 41a, the second connection circuit 53 being a path that extends from the main power supply unit 27 to the EPS control device 31 via the auxiliary power supply unit 29 and that includes a second contact 41b.

Specifically, the controller 33 of the EPS control device 31 performs control for switching so as to close the second connection circuit 53 (control for turning on the power increase mode, see FIG. 2B) in a case where the magnitude of power (the magnitude of "steering torque TR" in an embodiment of the present disclosure) required by the load (the assist motor 16 and the EPS control device 31) exceeds a predetermined first threshold ("first steering torque threshold TRth1" in an embodiment of the present disclosure), that is, in a case where it is not possible to supply power corresponding to the required power by only the main power supply unit 27.

The first open/close unit 43 is interposed between the auxiliary power supply unit 29 and the boosting circuit 30, as illustrated in FIGS. 2A and 2B. Specifically, the first open/close unit 43 is interposed between the second junction point P2 and the negative output terminal 30c of the boosting circuit 30.

The first open/close unit 43 operates so as to open or close a third contact 43a provided on a path extending from the negative output terminal 30c of the boosting circuit 30 to the auxiliary power supply unit 29 in accordance with an instruction provided by the EPS control device 31.

Specifically, the controller 33 of the EPS control device 31 performs control so as to close the third contact 43a of the first open/close unit 43 (control for turning off the power increase mode, see FIG. 2A) in a case where the magnitude of charged power of the auxiliary power supply unit 29 (for example, the charging rate of the auxiliary power supply unit 29) is smaller than a predetermined second threshold (for example, a charging rate threshold, such as 50%, based on which it is determined that charging is required). The first open/close unit 43 corresponds to "open/close unit" of the present disclosure. The third contact 43a corresponds to "contact" of the present disclosure.

The second open/close unit 45 is interposed between the circuit switching unit 41 and the auxiliary power supply unit 29, as illustrated in FIGS. 2A and 2B. Specifically, the second open/close unit 45 is interposed between the second junction point. P2 and the second contact 41b of the circuit switching unit 41.

The second open/close unit 45 includes a fourth contact 45a that is provided on a path extending from the circuit switching unit 41 to the auxiliary power supply unit 29, and operates so as to open or close the second connection circuit 53 in conjunction with the second contact 41b of the circuit switching unit 41 by opening or closing the fourth contact 45a.

Specifically, the controller 33 of the EPS control device 31 performs control for switching so as to close the second connection circuit 53 (control for turning on the power increase mode, see FIG. 2B) by closing the fourth contact 45a of the second open/close unit 45 similarly to the case of the second contact 41b of the circuit switching unit 41 in the case where the magnitude of power (the magnitude of "steering torque TR" in an embodiment of the present disclosure) required by the load (the assist motor 16 and the EPS control device 31) exceeds the predetermined first threshold ("first steering torque threshold TRth1" in an embodiment of the present disclosure), that is, in the case where it is not possible to supply power corresponding to the required power by only the main power supply unit 27.

Figure 3:
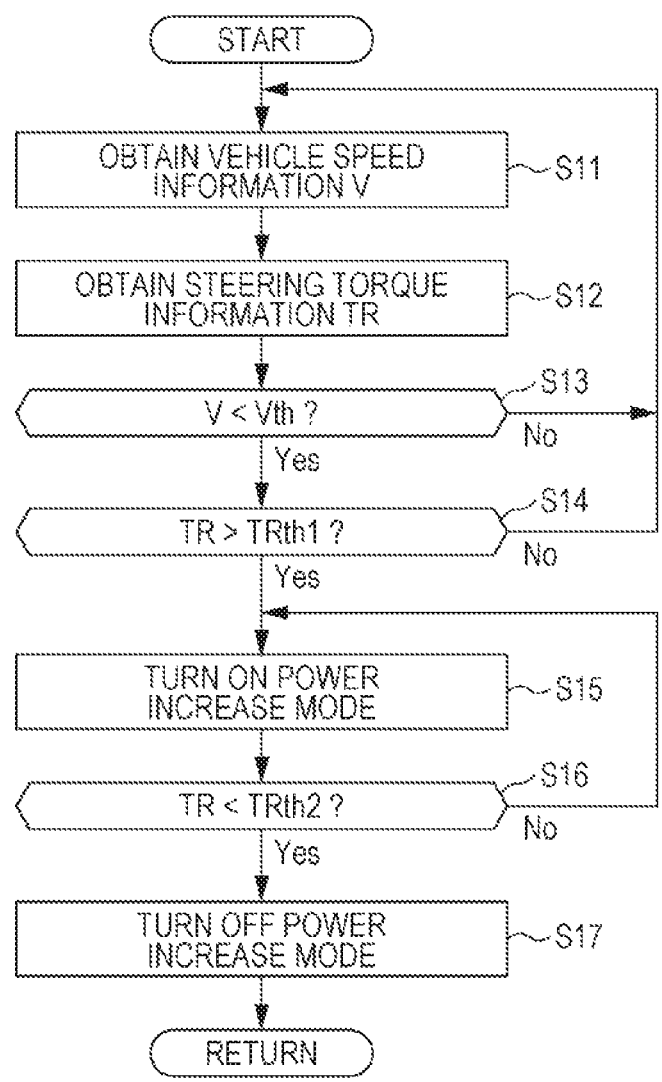
FIG. 3 is a flowchart for describing an operation performed by the electric power steering device according to an embodiment of the present disclosure.

Operation Performed by Electric Power Steering Device According to Embodiment of the Present Disclosure Now, an operation performed by the electric power steering device 11 according to an embodiment of the present disclosure is described with reference to FIG. 3. FIG. 3 is a flowchart for describing an operation performed by the electric power steering device 11 according to an embodiment of the present disclosure.

In steps S11 and S12 illustrated in FIG. 3, the controller 33 of the EPS control device 31 obtains steering information that includes the steering torque TR detected by the steering torque sensor 5 and the steering angle detected by the steering angle sensor 7, and vehicle information regarding the vehicle speed V detected by the vehicle speed sensor 9.

In step S13, the controller 33 of the EPS control device 31 determines whether the current vehicle speed V is smaller than a vehicle speed threshold Vth, which is a very low speed (for example, 5 to 20 km/h or so).

If it is determined as a result of the determination in step S13 that the current vehicle speed V is not smaller than the vehicle speed threshold Vth ("No" in step S13), the process flow returns to step S11, and the controller 33 of the EPS control device 31 performs the process in step S11 and the subsequent steps.

On the other hand, if it is determined as a result of the determination in step S13 that the current vehicle speed V is smaller than the vehicle speed threshold Vth ("Yes" in step S13), the process flow proceeds to step S14.

In step S14, the controller 33 of the EPS control device 31 determines whether the steering torque TR exceeds the predetermined first steering torque threshold TRth1. The first steering torque threshold TRth1 is appropriately set to a certain value based on which it is considered that power corresponding to the power required by the assist motor 16 is unable to be supplied by only the main power supply unit 27.

If it is determined as a result of the determination in step S14 that the steering torque TR does not exceed the first steering torque threshold TRth1 ("No" in step S14), the process flow returns to step S11, and the controller 33 of the EPS control device 31 performs the process in step S11 and the subsequent steps.

On the other hand, if it is determined as a result of the determination in step S14 that the steering torque TR exceeds the first steering torque threshold TRth1 ("Yes" in step S14), the process flow proceeds to step S15.

In step S15, the controller 33 of the EPS control device 31 considers that power corresponding to the required power is unable to be supplied by only the main power supply unit 27, and performs control to turn on the power increase mode. That is, the controller 33 of the EPS control device 31 performs control for switching so as to close the second connection circuit 53 (see FIG. 2B) by closing the second contact 41b of the circuit switching unit 41 and the fourth contact 45a of the second open/close unit 45, In step S16, the controller 33 of the EPS control device 31 determines whether the steering torque TR is smaller than a predetermined second steering torque threshold TRth2. Here, the second steering torque threshold TRth2 is appropriately set to a certain value (where the second steering torque threshold TRth2 is smaller than the first, steering torque threshold TRth1) based on which it is considered that power corresponding to the power required by the assist motor 16 is able to be supplied by only the main power supply unit 27.

If it is determined as a result of the determination in step S16 that the steering torque TR is not smaller than the second steering torque threshold TRth2 ("No" in step S16), the process flow returns to step S15, and the controller 33 of the EPS control device 31 performs control to keep the power increase mode on.

On the other hand, if it is determined as a result of the determination in step S16 that the steering torque TR is smaller than the second steering torque threshold TRth2 ("Yes" in step S16), the process flow proceeds to step S17.

In step S17, the controller 33 of the EPS control device 31 considers that power corresponding to the required power is able to be supplied by only the main power supply unit 27, and performs control to turn off the power increase mode. That is, the controller 33 of the EPS control device 31 performs control for switching so as to close the first connection circuit 51 by closing the first contact 41a of the circuit switching unit 41 and the third contact 43a of the first open/close unit 43, and performs control to supply a charging voltage to the auxiliary power supply unit 29 formed of the capacitor (see FIG. 2A).

Thereafter, the process flow returns to step S11, and the controller 33 of the EPS control device 31 performs the process in step S11 and the subsequent steps.

Figure 4A:
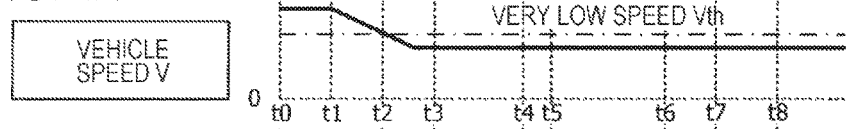
FIGS. 4A to 4F are time charts for describing an operation performed by the electric power steering device on a time-series basis according to an embodiment of the present disclosure.
Figure 4B:
Figure 4C:
Figure 4D:
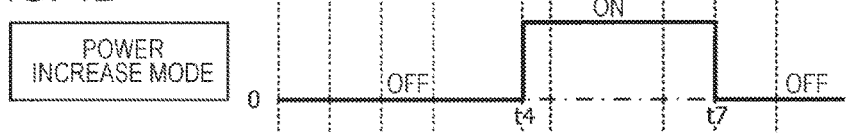
Figure 4E:
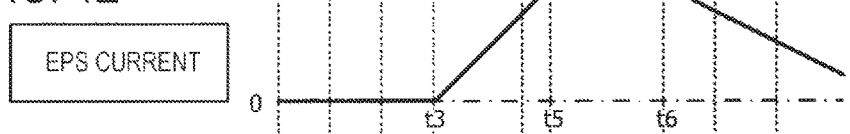
Figure 4F:

Operation Performed by Electric Power Steering Device on Time-Series Basis According to Embodiment of the Present Disclosure An operation performed by the electric power steering device 11 on a time-series basis according to an embodiment of the present disclosure is described with reference to FIGS. 4A to 4F. FIGS. 4A to 4F are time charts illustrating an operation performed on a time-series basis in which the power increase mode is turned on and off in a vehicle that travels at the vehicle speed V lower than the very low speed Vth. FIG. 4A illustrates the vehicle speed V that changes over time. FIG. 4B illustrates the steering torque TR that changes over time. FIG. 4C illustrates the capacitor voltage C that changes over time. FIG. 4D illustrates the on/off state of the power increase mode that changes over time. FIG. 4E illustrates the EPS current (the current flowing through the fourth junction point) that changes over time. FIG. 4F illustrates the EPS voltage (the voltage applied to the fourth junction point) that changes over time.

During the period from time t0 to time t1 in FIGS. 4A to 4F, the vehicle is traveling in a straight line at a constant speed exceeding the very low speed Vth (see FIG. 4A). During this period, the steering torque TR is equal to "0" (see FIG. 4B), and the capacitor voltage C is equal to Cmax, that is, the capacitor is in a fully charged state (see FIG. 4C). The power increase mode is in the off state (see FIG. 4D), the EPS current is equal to "0" (see FIG. 4E), and the EPS voltage is equal to the high potential Vhi (see FIG. 4F).

The speed of the vehicle gradually decreases over the period from time t1 to time t2 in FIGS. 4A to 4F and decreases to the very low speed Vth or lower at time t2 and thereafter (see FIG. 4A). Over this period, the value of the steering torque TR is equal to "0" (see FIG. 4B), and the capacitor voltage C is equal to Cmax, that is, the capacitor is in the fully charged state (see FIG. 4C). The power increase mode is in the off state (see FIG. 4D), the EPS current is equal to "0" (see FIG. 4E), and the EPS voltage remains in the high potential state where the EPS voltage is equal to Vhi (see FIG. 4F).

In the period from time t3 to time t4 in FIGS. 4A to 4F, the vehicle starts turning right or left or starts turning around. In association with this turning, the value of the steering torque TR gradually increases over the period from time t3 to t4 (see FIG. 4B). The capacitor voltage C is equal to Cmax, that is, the capacitor is in the fully charged state (see FIG. 4C). The power increase mode is in the off state (see FIG. 4D). The EPS current value gradually increases similarly to the value of the steering torque TR (see FIG. 4E). The EPS voltage value gradually decreases from the high potential Vhi (see FIG. 4F). This gradual decrease is a voltage drop event associated with the increase in the EPS current value and in accordance with the value of the combined resistance of the internal resistor R1 and the circuit resistor R2.

At time t4 in FIGS. 4A to 4F, the value of the steering torque TR exceeds the first steering torque threshold TRth1, and this state lasts over the period from time t4 to time t6 (see FIG. 4B). At time t7, the value of the steering torque TR decreases to the second steering torque threshold TRth2 and thereafter gradually decreases.

As described above, the first steering torque threshold TRth1 based on which the power increase mode is made to transition from the off state to the on state and the second steering torque threshold TRth2 based on which the power increase mode is made to transition from the on state to the off state are set so as to exhibit hysteresis. Therefore, it is possible to suppress a hunting event of the power increase mode (an event in which switching between the on state and the off state frequently occurs) and to suppress a rapid change in the EPS voltage value, and an effect of comfortable steering can be provided to the driver.

During the period from time t4 to time t7, it is considered that power corresponding to the power required by the assist motor 16 is unable to be supplied by only the main power supply unit 27, and the power increase mode is in the on state.

That is, over the period from time t4 to time t7, the capacitor voltage C gradually decreases from Cmax (the capacitor is discharged) (see FIG. 4C). The power increase mode is in the on state (see FIG. 4D). The EPS current value changes in accordance with the value of the steering torque TR (see FIG. 4E). The EPS voltage value gradually decreases from the high potential Vhi (see FIG. 4F).

At time t7 in FIGS. 4A to 4F, when the value of the steering torque TR decreases to the second steering torque threshold TRth2 (see FIG. 4B), it is considered that power corresponding to the power required by the assist motor 16 is able to be supplied by only the main power supply unit 27 at time t7 and thereafter, and the power increase mode enters the off state (see FIG. 4D).

That is, at time t7 and thereafter, the capacitor voltage C gradually increases towards Cmax (the capacitor is charged) (see the period from time t7 to time t8 in FIG. 4C). The power increase mode is in the off state (see FIG. 4D). The EPS current value changes in accordance with the value of the steering torque TR (see FIG. 4E). The EPS voltage value gradually increases towards the high potential Vhi (see FIG. 4F).

Effects Produced by Power Supply Device 25 According to Embodiment of the Present Disclosure Now, effects produced by the power supply device 25 according to an embodiment of the present disclosure are described.

The power supply device 25 according to an embodiment of the present disclosure includes the main power supply unit 27, the auxiliary power supply unit 29, the boosting circuit (booster) 30, the circuit switching unit 41, and the controller 33. The main power supply unit 27 is capable of supplying power to the load (the assist motor 16 and the EPS control device 31). The auxiliary power supply unit 29 is connected to the main power supply unit 27 and is capable of supplying charged power to the load. The boosting circuit 30 is connected to the auxiliary power supply unit 29 in parallel when viewed from the main power supply unit 27 and is capable of boosting a voltage supplied from the main power supply unit 27 and applying the resulting voltage to the auxiliary power supply unit 29. The circuit switching unit 41 is interposed between the main power supply unit 27 and the load and closes one of the first connection circuit 51 and the second connection circuit 53, the first, connection circuit 51 extending from the main power supply unit 27 to the load, the second connection circuit 53 extending from the main power supply unit 27 to the load via the auxiliary power supply unit 29. The controller 33 performs switching control on the circuit switching unit 41. The controller 33 obtains information regarding the magnitude of power required by the load. In the case where the magnitude of the power required by the load (steering torque TR) and indicated by the obtained information exceeds the predetermined first threshold (first steering torque threshold TRth1), that is, in the case where it is not possible to supply power corresponding to the power required by the load by only the main power supply unit 27, the controller 33 performs switching control on the circuit switching unit 41 so as to close the second connection circuit 53.

In the power supply device 25 according to an embodiment of the present disclosure, in the case where the magnitude of the power required by the load exceeds the predetermined first threshold, that is, in the case where it is not possible to supply power corresponding to the power required by the load by only the main power supply unit 27, the controller 33 performs switching control on the circuit switching unit 41 so as to close the second connection circuit 53. Therefore, even in a case where the power required by the load rapidly increases, power corresponding to the power required by the load can be appropriately supplied by applying power (voltage) obtained by combining the electromotive force (voltage) of the main power supply unit 27 and that of the auxiliary power supply unit 29.

The power supply device 25 according to an embodiment of the present disclosure further includes the first open/close unit (open/close unit) 43. The first open/close unit 43 is interposed between the boosting circuit (booster) 30 and the auxiliary power supply unit 29, and opens or closes the third contact (contact) 43a provided on the path extending from the boosting circuit (booster) 30 to the auxiliary power supply unit 29. In the case where the magnitude of the charged power of the auxiliary power supply unit 29 is smaller than the predetermined second threshold, that is, in a case where the auxiliary power supply unit 29 is in a state where the auxiliary power supply unit 29 needs to be charged, the controller 33 may control the first open/close unit (open/close unit) 43 so as to close the third contact (contact) 43a.

In the power supply device 25 according to an embodiment of the present disclosure, in the case where the auxiliary power supply unit 29 is in the state where the auxiliary power supply unit 29 needs to be charged, the controller 33 controls the first open/close unit (open/close unit) 4 3 so as to close the third contact (contact) 43a. Therefore, in addition to the above-described effect, operation of the electric power steering device 11 by using the main power supply unit 27 can be performed independently of charging of the auxiliary power supply unit 29 by using the boosting circuit (booster) 30.

Effects Produced by Electric Power Steering Device 11 According to Embodiment of the Present Disclosure Now, effects produced by the electric power steering device 11 according to an embodiment of the present disclosure are described.

The electric power steering device 11 according to an embodiment of the present disclosure incudes the power supply device 25 and is mounted in a vehicle. The power supply device 25 supplies power to the assist motor (steering assist motor) 16 included in the electric power steering device 11. The controller 33 may obtain the magnitude of power required by the load (the assist motor 16 and the EPS control device 31) on the basis of at least one of the steering torque TR of the steering wheel (steering member) 1 of the vehicle and the vehicle speed V.

With the above-described configuration, the controller 33 obtains the magnitude of power required by the load (the assist motor 16 and the EPS control device 31) on the basis of at least, one of the steering torque TR of the steering wheel (steering member) 1 of the vehicle and the vehicle speed V, and therefore, switching control on the circuit switching unit 41 can be performed on the basis of the magnitude of power required by the load, the magnitude being determined with high accuracy. Consequently, it is possible to more appropriately supply power corresponding to the power required by the load.

With the electric power steering device 11 according to an embodiment of the present disclosure, even in the case where the power required by the assist motor (steering assist motor) 16 rapidly increases, comfortable steering can be provided to the driver.

Further, with the electric power steering device 11 according to an embodiment of the present disclosure, power (voltage) obtained by combining the electromotive force (voltage) of the main power supply unit 27 and that of the auxiliary power supply unit 29 can be applied to the assist motor (steering assist motor) 16, and therefore, it is expected that the motor can be further downsized than a case of using a related art technique in which the rated power (size) of the motor is set on the basis of the maximum load of the assist motor 16.

Other Embodiments

The embodiments described above represent examples of realizing the present disclosure. Accordingly, the technical scope of the present disclosure should not be restrictively construed on the basis of the embodiments because the present disclosure can be implemented in various forms without, departing from the spirit or major features of the present disclosure.

For example, the description of the embodiments of the present disclosure has been given while assuming that the steering torque TR in the electric power steering device 11 is information regarding the magnitude of power required by the load, for example; however, the present disclosure is not limited to this example. Any index that correlates to the magnitude of power required by the load, such as the current that flows through the assist motor 16 or the magnitude of the steering angle, may be employed as information regarding the magnitude of power required by the load. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A power supply device comprising:
a main power supply unit that is capable of supplying power to a load;
an auxiliary power supply unit that is connected to the main power supply unit and is capable of supplying charged power to the load;

a booster that is connected to the main power supply unit in parallel to the auxiliary power supply unit and is capable of boosting a voltage supplied from the main power supply unit and applying a resulting boosted voltage to the auxiliary power supply unit;

a circuit switching unit that is interposed between the main power supply unit and the load and closes one of a first connection circuit and a second connection circuit, the first connection circuit extending from the main power supply unit to the load, the second connection circuit extending from the main power supply unit to the load via the auxiliary power supply unit; and a controller that performs switching control on the circuit switching unit;

a first open/close unit that is interposed between the booster and the auxiliary power supply unit, and opens or closes a first contact provided on a path extending from the booster to the auxiliary power supply unit; and a second open/close unit that is interposed between the circuit switching unit and the auxiliary power supply unit, and opens or closes a second contact provided on a path extending from the circuit switching unit to the auxiliary power supply unit, wherein the controller obtains information regarding a magnitude of power required by the load and, in a case where the magnitude of the power required by the load and indicated by the obtained information exceeds a predetermined first threshold, performs switching control on the circuit switching unit so as to close the second connection circuit and controls the second open/close unit to close the second contact, and the controller controls the first open/close unit so as to close the first contact in a case where a magnitude of the charged power of the auxiliary power supply unit is smaller than a predetermined second threshold.

2. An electric power steering device to be mounted in a vehicle, the electric power steering device comprising:

The power supply device according to claim 1, wherein the power supply device supplies power to a steering assist motor included in the electric power steering device, and the controller obtains the magnitude of the power required by the load on the basis of at least one of a steering torque of a steering member of the vehicle and a vehicle speed.

3. The power supply device according to claim 1, wherein the second connection circuit extends from the main power supply unit to the load in parallel to the first connection circuit via the auxiliary power supply unit.

4. The power supply device according to claim 3, wherein, in the case where the magnitude of the power required by the load and indicated by the obtained information exceeds the predetermined first threshold, the controller closes the second connection circuit and opens the first connection circuit such that the power required by the load is supplied by combining an electromotive force of the main power supply unit and the electromotive force of the auxiliary power supply unit.

5. The power supply device according to claim 1, wherein, the controller closes the first contact to charge the auxiliary power supply unit.

6. A power supply device comprising:

a main power supply that is capable of supplying power to a load;

an auxiliary power supply that is connected to the main power supply and is capable of supplying charged power to the load;

a booster circuit that is connected to the main power supply in parallel to the auxiliary power supply and is capable of boosting a voltage supplied from the main power supply and applying a resulting boosted voltage to the auxiliary power supply;

a circuit switching circuit that is interposed between the main power supply and the load and closes one of a first connection circuit and a second connection circuit, the first connection circuit extending from the main power supply to the load, the second connection circuit extending from the main power supply to the load via the auxiliary power supply; and a control circuit that performs switching control on the circuit switching circuit;

a first open/close circuit that is interposed between the booster circuit and the auxiliary power supply, and opens or closes a first contact provided on a path extending from the booster circuit to the auxiliary power supply; and a second open/close circuit that is interposed between the circuit switching circuit and the auxiliary power supply, and opens or closes a second contact provided on a path extending from the circuit switching circuit to the auxiliary power supply, wherein the control circuit obtains information regarding a magnitude of power required by the load and, in a case where the magnitude of the power required by the load and indicated by the obtained information exceeds a predetermined first threshold, performs switching control on the circuit switching circuit so as to close the second connection circuit and controls the second open/close circuit to close the second contact, and the control circuit controls the first open/close circuit so as to close the first contact in a case where a magnitude of the charged power of the auxiliary power supply is smaller than a predetermined second threshold.

7. An electric power steering device to be mounted in a vehicle, the electric power steering device comprising:

the power supply device according to claim 6, wherein the power supply device supplies power to a steering assist motor included in the electric power steering device, and the control circuit obtains the magnitude of the power required by the load on the basis of at least one of a steering torque of a steering member of the vehicle and a vehicle speed.

8. The power supply device according to claim 6, wherein the second connection circuit extends from the main power supply to the load in parallel to the first connection circuit via the auxiliary power supply.

9. The power supply device according to claim 8, wherein, in the case where the magnitude of the power required by the load and indicated by the obtained information exceeds the predetermined first threshold, the control circuit closes the second connection circuit and opens the first connection circuit such that the power required by the load is supplied by combining an electromotive force of the main power supply and the electromotive force of the auxiliary power supply.

10. The power supply device according to claim 6, wherein, the control circuit closes the contact to charge the auxiliary power supply.

* * * * *